Dec. 15, 1953     R. L. McILVAINE     2,662,756
LIQUID CONTACT APPARATUS FOR CLEANING GAS
Filed Aug. 22, 1950
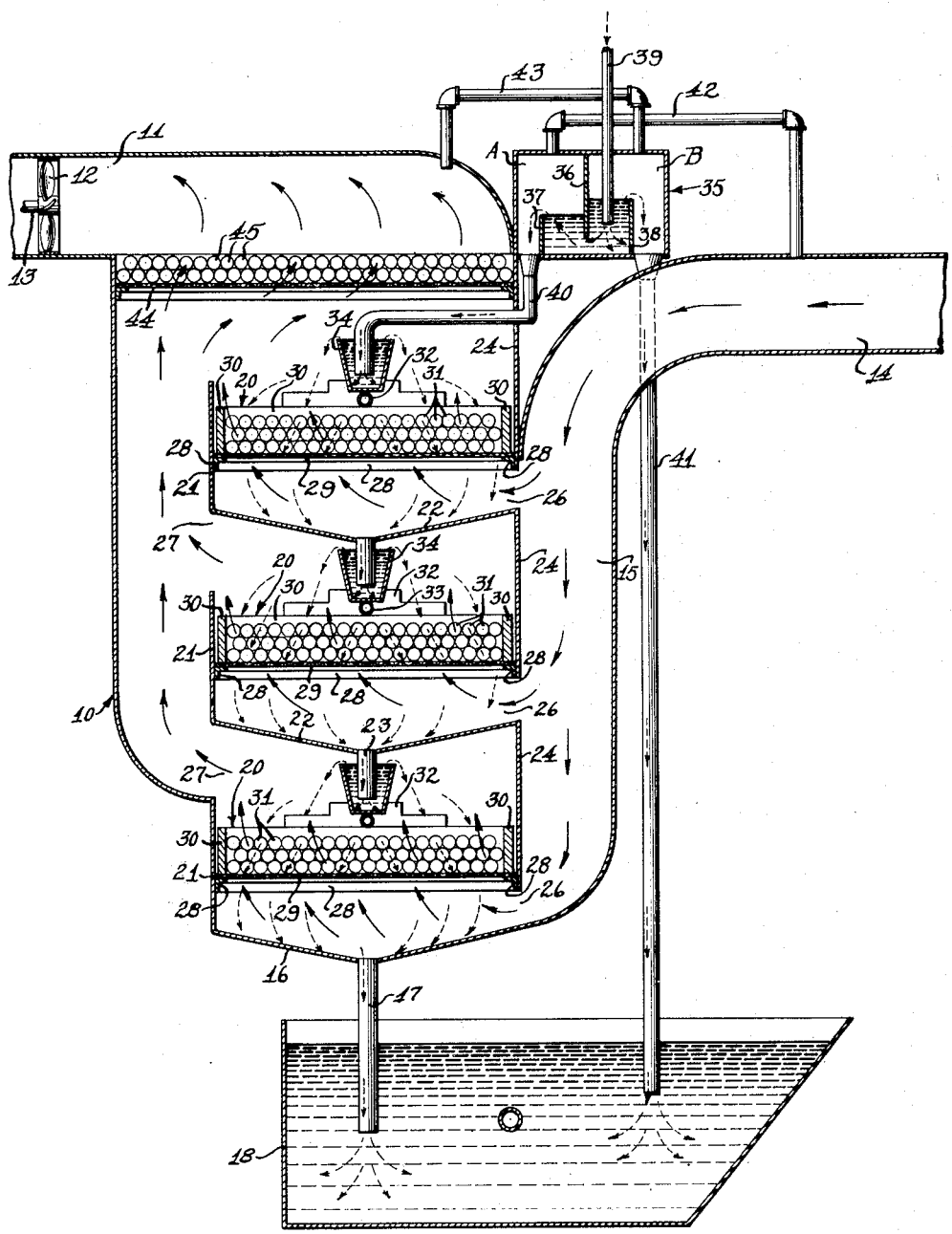
Inventor
Robert L. McIlvaine Patented Dec. 15, 1953

2,662,756

UNITED STATES PATENT OFFICE 2,662,756

LIQUID CONTACT APPARATUS FOR CLEANING GAS

Robert L. McIlvaine, Chicago, Ill., assignor, by mesne assignments, to Herbert Simpson Corporation, Chicago, Ill., a corporation of Illinois Application August 22, 1950, Serial No. 180,803

2 Claims. (Cl. 261—23)

The present invention relates to an improved method of dust collecting and apparatus therefor. More particularly, this invention is directed to the removal of dust from a fluid medium such as air by dividing a fluid stream into a plurality of components and passing the components through separate liquid baths disposed along the direction of flow of the fluid and all supplied with liquid from a common source.

It has been proposed in the dust collecting art that dust be removed from a fluid stream by bubbling the stream through a liquid bath. However, one of the serious difficulties encountered in such a dust collection system is the utilization of excessively large amounts of liquid, such as water, to provide a constantly moving liquid bath. Further, a single liquid bath is capable of accommodating only a limited amount of dust-laden fluid, inasmuch as the hydrostatic head pressure of the bath must be limited to accommodate an appreciable flow of pressurized fluid therethrough.

According to the principles of the present invention, a series of liquid baths are provided along the path of flow of dust-laden fluid, and the fluid stream entering the collector is divided into a plurality of components each of which is directed through one of the baths. The baths are so arranged that the flow of liquid into one of the baths is utilized for the removal of dust from fluid passing therethrough, and then this liquid is passed to the next bath so that it may again be utilized for dust removal. In this manner, more effective utilization of liquid is possible with each of the baths being retained at a depth consistent with maximum fluid flow and dust removal efficiency.

An additional feature of the present invention resides in the utilization of means for maintaining a relatively constant liquid level at the first bath, and consequently maintaining a substantially constant liquid level at the other baths arranged in series therewith, the liquid level being regulated in accordance with the pressure drop across the baths. An additional advantage of the utilization of separate baths each receiving one component of the first stream is the possibility of maintaining a minimum pressure drop across the system consistent with effective dust removal.

It is, therefore, an important object of the present invention to provide a method of dust collection in which dust-laden air is divided into a plurality of components, each of which is directed to a separate liquid bath.

Another object of the present invention is to effectively utilize a dust-removal liquid in a series of baths, with the liquid being transferred from one dust removal bath to another.

It is a further important object of the present invention to provide a dust-removal system wherein the dust-laden fluid stream is divided into a plurality of components, each of which is directed through a separate dust-removal water bath which is supplied with water from a common source and at a constant head pressure, a single stream of water flowing through each of the baths in turn for effectively utilizing the same.

Still another important object of the present invention is to provide a method of dust removal by the flowing of separate dust-laden fluid stream components through separate water baths supplied with water from a single source and each maintained at a substantially constant level.

Other and further important objects of the present invention will be apparent as the specification proceeds.

On the drawing:

The single figure of the drawing illustrates in cross-section, with parts shown in elevation, a dust collector of the present invention operating in accordance with the method of the present invention.

As shown on the drawing:

In the figure, reference numeral 10 refers generally to an exterior casing formed of fluid-impermeable material, such as sheet metal.

The casing is provided with an upper outlet 11 in which is mounted an exhaust fan 12, the shaft 13 of which is driven by suitable means, as by an electric motor (not shown). The interior of the casing 10 also communicates with an inlet conduit 14 formed with a depending end portion 15 having a vertically elongated open side in flow communication with the interior of the casing 10. The lower casing wall 16 is downwardly dished to empty into a central liquid discharge conduit 17 extending downwardly into the interior of a settling tank or receptacle 18. The casing interior is traversed by a plurality of superposed air-permeable baffles 20. The baffles 20 each comprise a casing section including an upstanding side wall 21 and a downwardly dished bottom wall 22 secured to the wall 21 and having a central depending discharge pipe 23. An opposing upstanding side wall 24 is provided in spaced relation to the wall 21 and extends thereabove for attachment to the dished outer wall 22 of the casing 20 immediately thereabove.

It will be seen that in the lowermost bath 20 the upstanding side wall 21 forms a portion of the exterior casing side wall, and the dished lower wall 22 of this section forms the bottom wall 16 of the entire casing while the dependent pipe 17 corresponds with the pipe 23 of the section immediately above the lowermost section. It will also be seen that the upstanding side walls 24 of adjacent units are spaced from one another and from the extreme bottom wall of the casing, the side walls 24 partially closing the open side of the inlet conduit section 15 and defining therebetween restricted inlet ports 26 establishing communication from the inlet conduit with each of the casings of the baths 20.

The opposing upstanding side walls 21 are spaced from the bottom wall 22 of the bath 20 next thereabove so that outlet passages 27 are provided for communication with the interior of the casing of each of the baths 20 and with the outlet conduit 11.

The bath side walls 21 and 24 extend transversely across the entire width of the casing 10 and carry on their opposing inner surfaces angle iron supports 28 which cooperate with the supports 28 on the end walls of the casing to form a generally rectangular support. On the supports provided by the irons 28 there is mounted a perforate screen 29 spanning the casing end walls and the bath casings. Upstanding tray side walls 30 extend upwardly from each screen. Within the tray side walls 30 and superimposed on the screen 21 there is provided a plurality of superimposed rows of generally spheroidal particles or marbles 31.

Extending above each of the tray end walls is a vertical support 32 which carries a length of pipe 33 extending longitudinally of the spheroid bed and closely overlying the same. The pipe 33 is vertically aligned with the pipe 23 of the bath 20 thereabove, and the pipe supports thereabove an elongated trough 34 surrounding the pipe 23 of the section next thereabove.

Liquid is supplied to the uppermost trough 34 through a liquid supply box 35 out of the casing 10. The box 35 is generally rectangular in shape and is provided with a central depending baffle 36 extending into spaced relation at the bottom of the box and defining in the interior of the box a pair of liquid chambers A and B. In the upper chamber A there is mounted a relatively low dam wall 37 while a higher dam wall 38 is mounted in the chamber B. The baffle 36 and the walls 37 and 38 extend completely across the interior of the box 35, and the dams in cooperation with the baffle define a liquid receiving space which receives liquid through an inlet conduit 39 directed to a suitable source of liquid under pressure. The chamber A carries a depending liquid conduit 40 which extends into the trough 34 of the uppermost water baths 20, and the chamber B carries a depending conduit 41 which extends into the sump tank 18. It will be seen that for liquid to enter the conduit 40 it must spill over the dam 37, and for liquid to enter the sump line 41 it must spill over the dam 38.

The chamber A is vented to the dust-laden air intake conduit 14 through a conduit 42, and the chamber B is vented to a discharge conduit 11 through conduit 43. It will thus be seen that the pressure within the chamber A is that pressure within the intake conduit 14, and the pressure upon the liquid in the chamber B is that of the conduit 11. The pressure within the discharge conduit 11 is less than the pressure within the intake conduit 14 due to the presence of the exhaust fan 13 in the discharge conduit and the resistance of the water baths. The lesser pressure within the chamber B will permit the support of a higher column of water behind the baffle 38 than that within the chamber A. Preferably, the resistance of the baffles 20 and 44—45 is correlated to the difference in height between the baffles 37 and 38. More particularly, this difference in height is equivalent to the pressure drop through the casing 10 when expressed in terms of inches of the liquid, such as water. An additional resistance is introduced in the casing 10 by the presence of a final screen 44 extending completely across the casing interior between the uppermost bath 20 and the discharge conduit 11. The screen 44 carries superimposed thereon a plurality of rows of spheroids 45.

The operation of the device will be evident from the foregoing description, from which it will be seen that air entering the inlet conduit 14 is divided into a plurality of individual streams passing through the restricted inlet passages 26 for passage upwardly through each of the water baths 20. After passage through the water bath 20, air from the water bath passes through the final spheroid bed 45 and outwardly through the discharge conduit 11.

Water is introduced into the water baths 20 through the conduit 40 in accordance with the pressure drop across the casing. This pressure drop, however, is measured across only one of the water baths and the final bed 45. Each of the water baths will have substantially the same pressure drop thereacross because of the common inlet and discharge to and from the baths which will tend to equalize the intake and discharge pressure.

The constant head pressure is regulated by the difference in the height of the baffles 37 and 38 so that if the resistance through any one of the water baths increases due to an increased flow of liquid, this pressure drop will be reflected in the water level behind the baffles 37 and 38 with an increased discharge of water to the sump line 41. This discharge to the sump line 41 will prevent discharge through the water inlet line 40 so that the resistance across the bed will be reduced until it again is equivalent to the difference in height of the water level, at which time flow will again be resumed over the dam 37 and through the line 40 into the water bed. Water flow over the dam 37 is actually directed into the first or uppermost trough 34, this water spilling over the trough into the water bed 20 through the water bed against the dished bottom 22 and through the discharge line 23 into the next trough 34 positioned therebeneath. Thus, it is only necessary to supply to the device that water necessary for one marble bed, with this water being re-used at the lower water beds for the effective removal of dust from fluid flowing therethrough. The consequent saving of water will be appreciated by those skilled in the art and conversant with the problem of effectively removing dust in water flow devices of this type.

Other advantages of the present invention will be readily appreciated in that it is possible to block off one of the restricted inlet passages 26 so as to cut down the capacity of the dust removal unit when full capacity is not being utilized. A reduction in the number of actual dust removal units does not in any manner affect operation of the other units, and fluid flow will reapportion itself between those of the units remaining in use.

During fluid flow to the water beds the spheroidal particles 31, which define restricted interstices therebetween, will cause bubbling of the water pouring through the beds in a direction counter to the flow of fluid upwardly therethrough. This bubbling is advantageous for dust removal in that it serves two distinct purposes. First, dust will adhere to the walls of the bubbles formed in the water beds and these bubbles are permitted to burst upon their escape upwardly from the interstices. The bursting of these bubbles will free flying liquid particles which will serve to entrap additonal dust from the air. Also, the bubbles themselves will cause some removal of dust by adhesion of the dust to the walls of the bubbles for subsequent discharge through the drain. In this manner, effective dust removal will be effected.

The uppermost bed 45 also serves a dust-removal purpose inasmuch as it provides a surface which will be wetted by bubbles bursting therebelow and also by water carried by fluid flowing upwardly to this bed, and the wetted surface will remove remaining dust particles which impinge thereon during passage of the fluid through a restricted bed.

It will be understood that modifications and variations may be effected without departing from the scope of the novel concepts of the present invention.

I claim as my invention:

1. A dust collector comprising an exterior housing providing an inlet for dust-laden gas, an outlet for clean gas, and a gas passageway therebetween, a plurality of superimposed interior casing sections within said passageway, each of said casing sections having a gas permeable supporting member and a dished drainage member underlying said gas permeable member and overlying the next lower casing section, baffle means including said drainage members connecting opposite ends of superadjacent casing sections to define staggered inlet and outlet passages for each casing section, and means for introducing a liquid into the uppermost of said casing sections for drainage through the gas permeable member to the drainage member therebeneath and for collection at the lowermost portion of the dished drainage member for delivery to the subadjacent casing section.

2. A dust collector comprising an exterior housing provided with an inlet for dust-laden gas, an outlet for clean gas, and a gas passageway therebetween, a plurality of superimposed interior casing sections within said passageway, each of said casing sections having a gas permeable supporting member and a dished drainage member underlying said gas permeable member and overlying the next lower casing section, baffle means including said drainage members connecting opposite ends of superadjacent casing sections to define staggered inlet and outlet passages for each of said casing sections, a drainage pipe connected to the lowermost portion of said dished drainage members, an elongated trough surrounding said drainage pipe beneath the dished drainage member and above the subadjacent casing section for collecting liquid from the superadjacent dished drainage member and delivering it to the subadjacent casing section, and means for introducing a liquid into the uppermost of said casing sections for drainage to the subadjacent dished drainage member and through the drainage pipe to the subadjacent elongated trough and for overflow from said trough to the subadjacent casing section.

ROBERT L. McILVAINE.

References Cited in the file of this patent

UNITED STATES PATENTS

| Number | Name | Date |
|---|---|---|
| 199,492 | Balmore | Jan. 22, 1878 |
| 1,108,853 | Sewell | Aug. 25, 1914 |
| 1,521,575 | Wittemeier | Dec. 30, 1924 |
| 1,809,926 | Einsler et al. | June 16, 1931 |
| 2,303,811 | Badenhausen | Dec. 1, 1942 |
| 2,354,674 | Fisher | Aug. 1, 1944 |
| 2,394,023 | Strickland | Feb. 5, 1946 |
| 2,490,079 | Melvill | Dec. 6, 1949 |

FOREIGN PATENTS

| Number | Country | Date |
|---|---|---|
| 102,216 | Sweden | Aug. 5, 1941 |
| 292,102 | Italy | Jan. 5, 1932 |